May 10, 1960 R. P. HAVILAND 2,935,843
COMBUSTION MOTOR STARTING AND SIGNAL MEANS
Filed July 1, 1954
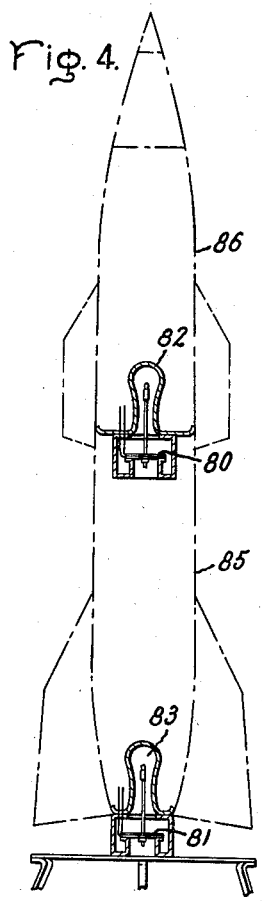
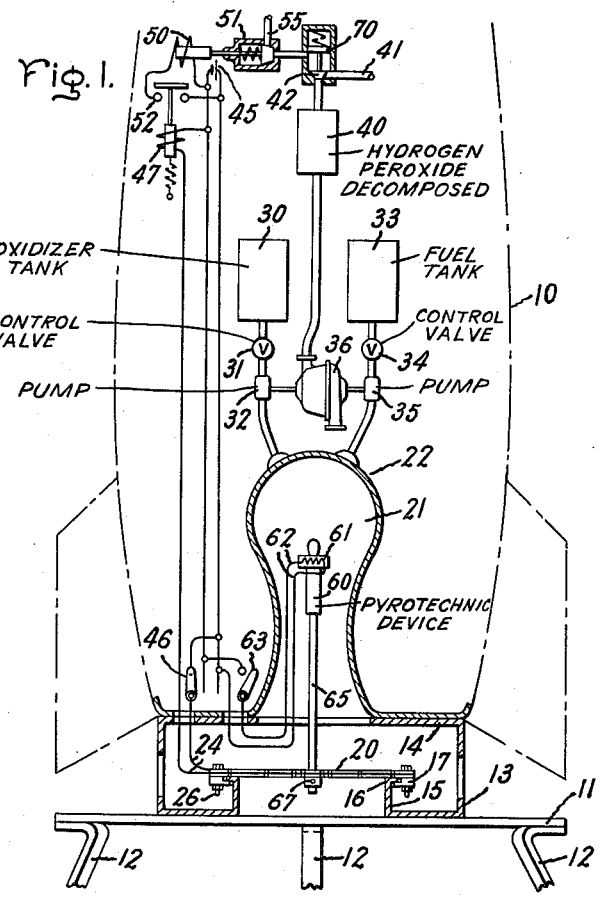
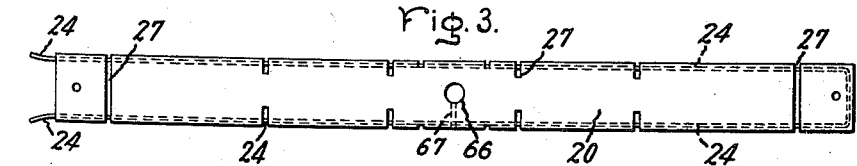
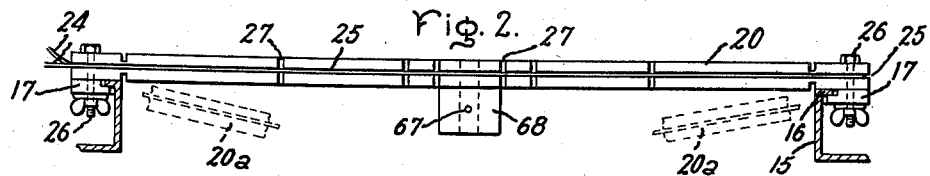
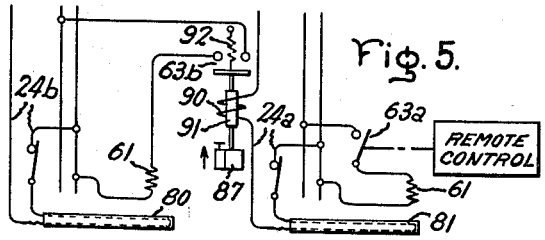
Inventor:
Robert P. Haviland,
by Claude␣A.␣Mott.
His Attorney.

United States Patent Office 2,935,843
Patented May 10, 1960

2,935,843

COMBUSTION MOTOR STARTING AND SIGNAL MEANS

Robert P. Haviland, Key West, Fla., assignor to General Electric Company, a corporation of New York Application July 1, 1954, Serial No. 440,822

5 Claims. (Cl. 60—39.14)

This invention relates to combustion motor starting and signal means, more particularly to means for starting combustion in combustion motors, such as rocket motors, and has for one of its objects the provision of means responsive to the initiation of combustion for controlling the supply of reactants to the combustion chamber during starting.

In the control of operations involved in the starting of rocket motors or other powerplants involving combustion of reactants, it is almost compulsory that the operators be sure that combustion has started within the combustion chamber before the turbine and the pumps for the reactants are started. One of the reasons this is desirable is that if the turbopump begins pumping reactants into the combustion chamber before combustion has initiated, it is possible that combustion never will begin, and, consequently, expensive reactants will be pumped and cannot be recovered. Alternatively, if combustion does commence after the turbopump has started pumping reactants, such combustion is likely to be in the form of an explosion, perhaps violent, with the accompanying loss of both reactants and rocket motor.

An observed property of the initiation of combustion within a rocket motor is a marked and sudden rise in the pressure within the combustion chamber. It is also an observed property that this pressure surge is propagated through the throat and nozzle of the motor, so that it appears externally after a very short delay, on the order of a few milli-seconds. For most practical purposes this delay is entirely negligible.

It is, therefore, an important object of the present invention to provide a combustion motor starting and control signal means which greatly reduces the likelihood of any of the mishaps referred to above.

Another object is to provide a simple and inexpensive device for providing a signal substantially simultaneously with the initiation of combustion in a combustion chamber.

Another object is to provide, in a system involving a plurality of rocket motors, means for controlling the sequence of operation of the system through the application of signals obtained from one or more of the rocket motors.

Briefly stated, in accordance with one aspect of this invention, a device is provided for providing a signal in response to the pressure surge accompanying the initiation of combustion in a combustion chamber together with means responsive to this signal for controlling the reactant supplied to the combustion chamber in such manner that upon failure of the initiation of combustion, no additional reactant is supplied to the combustion chamber.

The invention will be better understood and the objects will become apparent on perusal of the following specification and claims together with the single sheet of drawings.

In the drawings:

Fig. 1 is a fragmentary partly diagrammatic view of a rocket vehicle and certain parts of a rocket propulsion system illustrating the principles of this invention;

Fig. 2 is an enlarged elevation of the signal device of Fig. 1;

Fig. 3 is a top view of the device shown in Fig. 2;

Fig. 4 is a diagrammatic view of a two-step rocket vehicle having a plurality of motors illustrating the principles of this invention; and Fig. 5 is a circuit diagram showing the control arrangement between the motors of Fig. 4.

Referring more particularly to the drawings, a rocket vehicle 10 is shown in phantom supported on a suitable launching stand 11 in position to take off. The launching stand 11 has supporting legs 12 and has attached thereto an annular support bracket 13 with an upper flange 14 on which the vehicle is seated. An annular projection 15 of the support bracket has a shoulder 16 which cooperates with an annular ring 17 to support and anchor the start signal device including a frangible member 20 which is illustrative of this invention.

A start signal device is provided for providing a signal substantially simultaneously with the initiation of combustion within the combustion chamber of the rocket vehicle. In the illustrated embodiment, this device comprises a frangible member 20 adapted to be supported in the path of the combustion gases emanating from the chamber 21 of the rocket motor 22. This frangible member is so constructed and arranged that it will be fractured by the pressure surge from the initiation of combustion within the combustion chamber. In the preferred embodiment, the frangible member 20 is wooden, white pine having been found to be a suitable material. The signal device also includes an electrical conductor 24 supported by the frangible member 20. This conductor 24, as shown in the drawing, extends along opposite edges the full length of the member 20 and across one end. It is preferably bonded to the member 20 in grooves 25 provided around the edges of the member 20. The conductor is thus protected from any accidental fires of brief duration which may occur in the starting operations. While the signal device of this invention has been described as including both a frangible member and an electrical conductor, it will be understood that the provision of a frangible member made of electrically conductive material is contemplated and that such is within the scope of this invention.

The frangible member 20 may be secured to the annular ring 17 and thereby to the launching stand 11 by suitable fastening members, e.g., bolts 26. The particular size and shape of the frangible member 20 will be selected, of course, to suit the design characteristics of the combustion system with which it is used. It has been found that notches, such as 27, cut into the frangible member 20 are useful to insure that the member will fracture in response to the pressure surge as desired.

In the propulsion system diagrammatically shown in Fig. 1, an oxidizer tank 30 is provided for supplying an oxidizer, e.g., liquid oxygen, to the combustion chamber 21 through a suitable control valve 31, and a pump 32. Similarly, another reactant, e.g., a fuel such as alcohol, is contained in fuel tank 33 and is carried to the combustion chamber through a control valve 34 and pump 35. The pumps 32 and 35 are driven by a turbine 36, this unit making up a suitable turbopump, e.g., of the type used in the German V-2 rocket vehicle, as disclosed in Rocket Propulsion Elements, by G. P. Sutton, at page 195, Fig. 7-4. In the illustrated embodiment, the turbine receives its drive power from a hydrogen peroxide decomposer 40, to which hydrogen peroxide is supplied from a conduit 41 through a pneumatic valve 42.

Means are provided responsive to the combustion start signal for controlling the reactant supply to the chamber. This means in the illustrated embodiment is in the form of an electrical circuit, including a source, e.g., a battery 45, and associated valves. One end of the conductor 24 is connected through a switch 46 to one terminal of the battery 45. The other end of the conductor 24 is connected in series with the energizing coil of a relay 47 and with the battery 45. The energizing coil 50 of a solenoid valve 51 is connected in series with the battery 45 and with the contacts 52 of the relay 47. The relay 47 is spring-biased into open position. The solenoid valve 51 is a normally closed valve controlling the flow of a pneumatic fluid, usually compressed air, through the conduit 55 to the pneumatic valve 42.

Combustion may be initiated within the combustion chamber 21 by a suitable ignitor, such as pyrotechnic device 60. This pyrotechnic device comprises a container for slow burning powder and a high resistance wire 61 connected in a circuit 62 through a switch 63 to a source of voltage, e.g., battery 45. The ignitor or pyrotechnic device 60 is supported on a rod 65, preferably of wood, which is fixed within a bore 66 in the frangible member 20 by a set screw 67 in holder 68. While the illustrated means of supporting the ignitor have been found suitable, it will be understood that the ignitor could be supported in any other suitable manner from the launching stand separate from the frangible member 20.

Operation

In the operation of the propulsion system and launching system described, the first step is the firing of the ignitor 60 which is accomplished by the closing of the switch 63, whereupon the wire 61 is heated to ignite the powder and provide sparks within the combustion chamber 21. The oxidizer and fuel valves 31 and 34 are then partially opened for gravity flow of the reactants to the combustion chamber to initiate combustion. The pressure surge accompanying the initiation of combustion fractures the frangible member 20 substantially simultaneously with the start of combustion by the ignitor. Upon fracture of the frangible member 20 (as seen by dotted pieces 20a), the conductor 24 is broken to interrupt the circuit holding the relay 47 in its open position and thereby provide a signal. Interruption of this circuit permits the relay spring to close the contacts 52 and energize the coil 50 of the solenoid valve 51 to open the pneumatic pressure supply line 55 to the valve 42. Pressure acting against the piston 70 opens the pneumatic valve 42 to admit hydrogen peroxide to the decomposer 40 to start up the turbopump 36. Operation of the turbopump 36 in turn increases the flow rate of the reactants to the combustion chamber to bring combustion up to a predetermined operating condition, the valves 31 and 34 having been fully opened by the pressure in the pumps as described in Rocket Propulsion Elements, cited above, pages 223 and 224, parts (b) and (c) of the German V-2 operation description referring to Fig. 7-22.

In Fig. 4, a two-step rocket vehicle is shown in which use can be made of a plurality of start signal devices 80 and 81 to control the sequence of operations of a plurality of rocket motors. The control system of each of the rocket motors 82 and 83 shown can be similar to that described in connection with Fig. 1. In the operation of the two-step rocket vehicle, each of the combustion chambers 82 and 83 will have combustion initiated therein by the closing of switches 63a and 63b (see Fig. 5) corresponding to switch 63 in Fig. 1. In the booster or "mother" vehicle 85, the switch 63a will be closed, preferably by remote control from a ground control station. The closing of the ignitor switch 63b for the "daughter" vehicle 86 can be accomplished by the use of a suitable timing mechanism, e.g., a dashpot 87 adapted to close the switch a predetermined time after the initiation of combustion in combustion chamber 83. Thus, as shown in Fig. 5, a coil 90, connected into the conductor 24a and energized in the same manner as conductor 24 shown in Fig. 1, holds a plunger 91 against the action of a spring 92 to maintain the switch 63b in open position. Upon initiation of combustion in chamber 83, the conductor 24a breaks, as explained above, deenergizing the coil 90, permitting the plunger 91 to close the switch 63b against the delaying action of the dashpot 87. The portions of the circuits of Fig. 5 for controlling the reactant supply to each rocket motor are identical with that shown in Fig. 1 and, therefore, are not duplicated in Fig. 5.

While the preferred embodiment of this invention has been illustrated and described, the invention is not limited to the embodiment shown and it is intended in the appended claims to cover all changes and modifications of the embodiment of the invention disclosed which do not constitute departures from the spirit and scope of the invention.

What I claim as new and desire to secure by Letters Patent of the United States is:

1. A starting means for a combustion motor provided with a combustion chamber comprising a frangible member adapted to be supported in the path of combustion gases emanating from said chamber, a nozzle exit for combustion gases, a conductor adapted for connection into an electric circuit and supported on the frangible member, said frangible member and said conductor being so constructed and arranged that the pressure surge through said nozzle from the initiation of combustion will fracture both said frangible member and said conductor to open said circuit, reactant supply control means in said circuit, and means responsive to the opening of said circuit for operating said reactant supply control means to increase the flow of the reactant.

2. Starting means for a rocket motor having a combustion chamber, a nozzle for exit of combustion gases, a source of propellant having at least one reactant for supporting combustion and means for initiating combustion in said chamber; a device for interrupting an electrical circuit substantially simultaneously with the initiation of combustion; said interruption means comprising a frangible member supported in the path of combustion gases emanating from said nozzle, the frangible member being so constructed and arranged that it will fracture in response to the pressure surge through said nozzle accompanying the initiation of combustion, and an electric conductor connected into a normally closed circuit and supported on the frangible member in such manner that it will break and open said circuit in response to fracture of the frangible member, and means responsive to the opening of said circuit for supplying reactants to said chamber.

3. For use with a rocket motor having a combustion chamber, a nozzle for exit of combustion gases, at least one reactant for supporting combustion and means for initiating combustion in said chamber and for initiating the flow of the reactant to said chamber; a device for initiating control of the flow of said reactant substantially simultaneously with the initiation of combustion; said device comprising a wooden member having a substantially flat portion so constructed and arranged that it will fracture in response to the pressure surge through said nozzle accompanying the initiation of combustion, and means associated with said wooden member for controlling said flow of the reactant in response to fracture of said wooden member.

4. A device as set forth in claim 3, said last-named means including an electric conductor, said conductor being secured to the wooden member so that it will break in response to fracture of the wooden member and thereby initiate control of the flow of the reactant to the combustion chamber.

5. In a system comprising a plurality of interconnected rocket motors adapted to be operated in sequence, each motor provided with a combustion chamber, a starting means comprising a frangible member supported in the path of combustion gases emanating from said chamber, a nozzle exit for combustion gases, a conductor adapted for connection into an electric circuit and supported on the frangible member, said frangible member and said conductor being so constructed and arranged that the pressure surge through said nozzle from the initiation of combustion will fracture both said frangible member and said conductor to open said circuit, reactant supply control means in said circuit, and means responsive to the opening of said circuit for operating said reactant supply control means to increase the flow of reactant.

References Cited in the file of this patent

UNITED STATES PATENTS

| | | |
|---|---|---|
| 2,470,564 | Lawrence | May 17, 1949 |
| 2,518,882 | Goddard | Aug. 15, 1950 |
| 2,645,999 | Bogard | July 21, 1953 |
| 2,668,412 | Abramson | Feb. 9, 1954 |
| 2,671,312 | Roy | Mar. 9, 1954 |
| 2,683,963 | Chandler | July 20, 1954 |
| 2,741,085 | Prentiss | Apr. 10, 1956 |

FOREIGN PATENTS

| | | |
|---|---|---|
| 702,779 | Great Britain | Jan. 20, 1954 |